(12) United States Patent
Kunii et al.

(10) Patent No.: US 8,693,067 B2
(45) Date of Patent: Apr. 8, 2014

(54) IMAGE READING DEVICE

(75) Inventors: Tadahiro Kunii, Nagoya (JP); Tetsuya Kato, Aichi-ken (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 115 days.

(21) Appl. No.: 13/362,616

(22) Filed: Jan. 31, 2012

(65) Prior Publication Data

US 2012/0218610 A1 Aug. 30, 2012

(30) Foreign Application Priority Data

Feb. 25, 2011 (JP) ................................ 2011-040215

(51) Int. Cl.
*H04N 1/04* (2006.01)

(52) U.S. Cl.
USPC ............................ 358/474; 358/445; 358/498

(58) Field of Classification Search
USPC .................. 358/474, 498, 513, 514, 497, 445
See application file for complete search history.

(56) References Cited

U.S. PATENT DOCUMENTS

| 6,160,640 | A   |   | 12/2000 | Ohmori |   |
|-----------|-----|---|---------|--------|---|
| 6,563,611 | B1  | * | 5/2003  | Kao ............................... | 358/498 |
| 6,721,074 | B1  | * | 4/2004  | Kao ............................... | 358/496 |
| 6,760,131 | B2  | * | 7/2004  | Kaji .............................. | 358/474 |
| 7,218,425 | B2  | * | 5/2007  | Saida et al. .................... | 358/437 |
| 7,388,691 | B2  | * | 6/2008  | Wang ............................. | 358/474 |
| 7,518,763 | B2  | * | 4/2009  | Shiraishi et al. .............. | 358/475 |
| 7,612,925 | B2  | * | 11/2009 | Tseng ............................ | 358/496 |
| 7,626,735 | B2  | * | 12/2009 | Mizuhashi et al. ........... | 358/474 |
| 7,652,805 | B2  |   | 1/2010  | Oguri et al. |   |
| 7,864,383 | B2  | * | 1/2011  | Shiraishi ........................ | 358/474 |
| 7,889,393 | B2  | * | 2/2011  | Yoshizawa ................... | 358/3.01 |
| 7,907,310 | B2  | * | 3/2011  | Wang ............................. | 358/474 |
| 8,144,375 | B2  | * | 3/2012  | Tanimoto et al. ............. | 358/474 |
| 8,237,997 | B2  | * | 8/2012  | Okumura ...................... | 358/496 |
| 8,289,589 | B2  | * | 10/2012 | Matsushima ................. | 358/498 |
| 8,508,778 | B2  | * | 8/2013  | Tanimoto et al. ............. | 358/1.15 |

(Continued)

FOREIGN PATENT DOCUMENTS

| JP | H09-200437 A | 7/1997 |
|----|--------------|--------|
| JP | H11-055530 A | 2/1999 |
| JP | 2003-110807 A | 4/2003 |
| JP | 2006-025445 A | 1/2006 |

(Continued)

OTHER PUBLICATIONS

U.S. Appl. No. 13/075,802, to Okada, filed Mar. 30, 2011.

*Primary Examiner* — Negussie Worku
(74) *Attorney, Agent, or Firm* — Scully, Scott, Murphy & Presser, P.C.

(57) ABSTRACT

An image reading device includes first and second reading units, first and second converting units, and a setting unit. The first and second reading units include N-number of first sub-regions and M-number of second sub-regions, respectively. Each converting unit includes L-number of channels. Each channel converts analog signal into digital signal. When the setting unit sets the double-sided read mode, P-number of first sub-regions are connected to the first converting unit and M-number of second sub-regions are connected to the second converting unit. When the read mode setting unit sets the single-sided read mode, P-number of first sub-regions are connected to the first converting unit and the remaining first sub-regions are connected to the second converting unit. L is greater than or equal to M and smaller than or equal to N. N is smaller than or equal to 2×L.

6 Claims, 5 Drawing Sheets

(56) References Cited

U.S. PATENT DOCUMENTS

| | | | |
|---|---|---|---|
| 8,576,461 B2 * | 11/2013 | Nagasaka | 358/482 |
| 2003/0063332 A1 | 4/2003 | Sato | |
| 2007/0002399 A1 | 1/2007 | Kato | |
| 2007/0002409 A1 | 1/2007 | Oguri et al. | |
| 2011/0242614 A1 | 10/2011 | Okada | |

FOREIGN PATENT DOCUMENTS

| | | |
|---|---|---|
| JP | 2007-013528 A | 1/2007 |
| JP | 2007-013743 | 1/2007 |
| JP | 2007-281718 A | 10/2007 |
| JP | 2008-085600 | 4/2008 |
| JP | 2011-217017 A | 10/2011 |

* cited by examiner

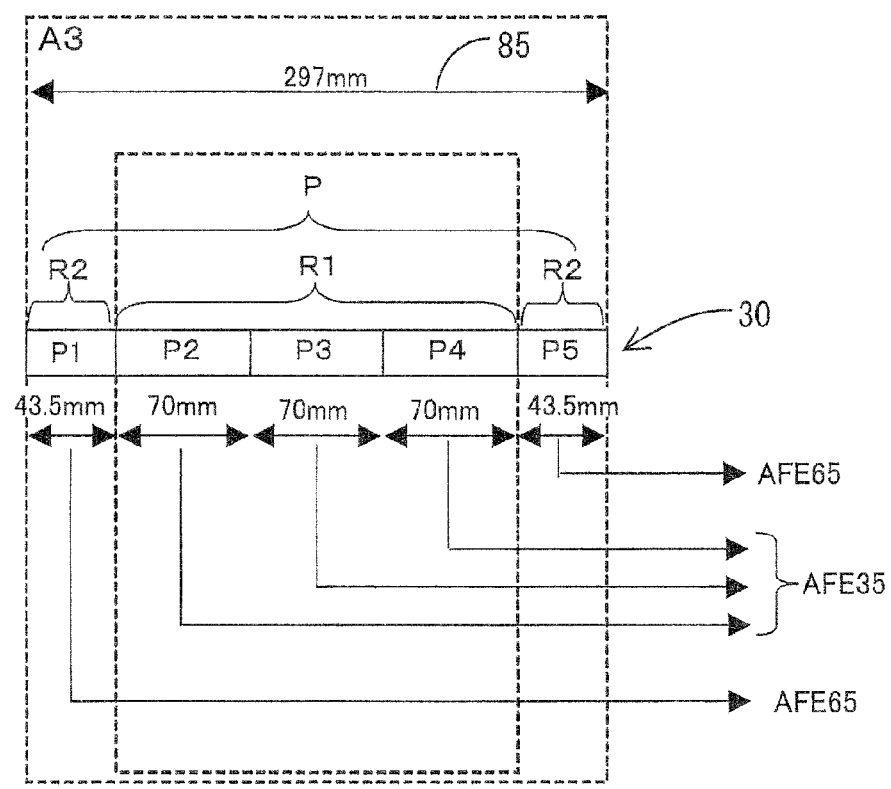
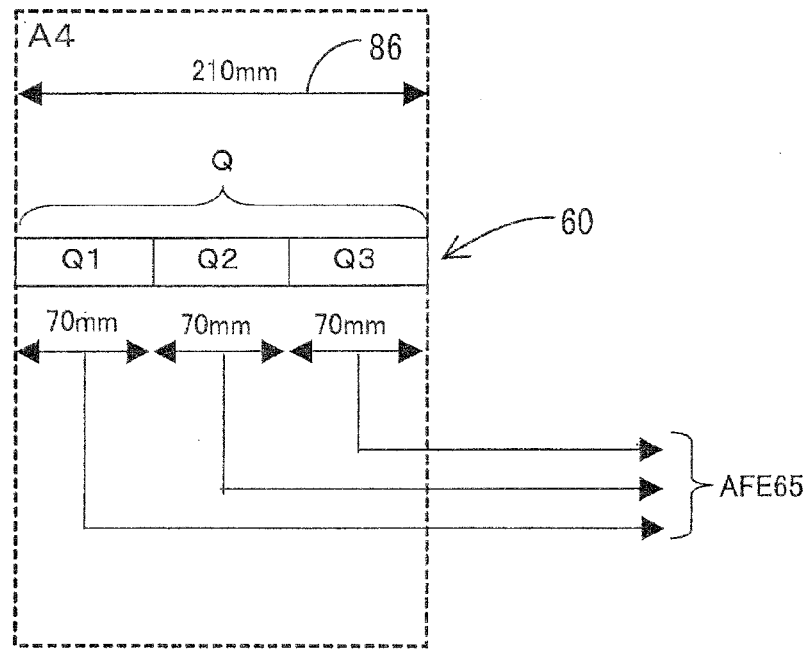

IMAGE READING DEVICE

CROSS REFERENCE TO RELATED APPLICATION

This application claims priority from Japanese Patent Application No. 2011-040215 filed Feb. 25, 2011. The entire content of the priority application is incorporated herein by reference,

TECHNICAL FIELD

The present invention relates to an image reading device.

BACKGROUND

The conventional image-reading devices divide the reading area for each reading unit into a plurality of sub-regions, and the reading units output data read from the original by sub-region. The read data outputted for each sub-region is in the form of an analog signal. An analog front end (AFE) with an A/D converter circuit is provided for converting the analog signals outputted from the reading units to digital read signals. The AFE has a plurality of channels and, hence, can simultaneously process read data for a number of sub-regions equivalent to the number of channels.

SUMMARY

A conversion unit, like the AFE, that has a plurality of channels and is capable of converting analog signals outputted by reading units to digital signals becomes more expensive and takes up more space as the number of channels increases. Therefore, it is desirable to reduce the number of required channels through effective usage of the conversion unit. However, when one reading unit used to read one surface of the original and another reading unit used to read the other surface are connected to separate conversion units, one of the conversion units is idle during single-side image reading and is therefore not being used effectively. Further, if the maximum sheet size supported by the reading units differs, then the conversion unit connected to the reading unit that supports a larger sheet size is not effectively used during double-sided image reading. Examples of image reading devices that do not effectively use their conversion unit or that have more conversion units than necessary are common.

In view of the foregoing, it is an object of the invention to provide a technology for reducing the number of conversion units required for an image reading device.

In order to attain the above and other objects, the invention provides an image reading device including a first reading unit, a second reading unit, a first converting unit, a second converting unit, and a read mode setting unit. The first reading unit is configured to read one surface of an original sheet. The first reading unit includes a first reading region having a first width. The first reading region is divided into N-number of first sub-regions each of which reads a respective portion of the one surface. The N-number of first sub-regions acquire N-number of sets of analog signal respectively. The original sheet has the one surface and another surface. The second reading unit is configured to read the another surface and includes a second reading region having a second width shorter than the first width. The second reading region is divided into M-number of second sub-regions each of which reads a respective portion of the another surface. The M-number of second sub-regions acquire M-number of sets of analog signal respectively. M is an integer smaller than N. The first converting unit includes L-number of first channels each of which is configured to convert a set of analog signal into a set of digital signal. L is an integer greater than or equal to M and smaller than or equal to N. N is smaller than or equal to 2×L. The second converting unit includes L-number of second channels each of which is configured to convert a set of analog signal into a set of digital signal. The read mode setting unit is configured to set one of a single-sided read mode in which the first reading unit reads the one surface and the second reading unit fails to read the another surface and a double-sided read mode in which the first reading unit reads the one surface and the second reading unit reads the another surface. When the read mode setting unit sets the double-sided read mode, P-number of first channels of the L-number of the first channels are connected to P-number of first sub-regions of the N-number of first sub-regions to convert P-number of analog signal sets into P-number of digital signal sets. P is an integer smaller than or equal to L. The P-number of first sub-regions are adjacent to each other and defines a third reading region having a third width longer than or equal to the second width. The N-number of first sub-regions include the remaining (N-P)-number of first sub-regions other than the P-number of first sub-regions. The remaining (N-P)-number of first sub-regions fail to be connected to any first channel and any second channel. M-number of second channels of the L-number of second channels are connected to the M-number of second sub-regions to convert M-number of analog signal sets into M-number of digital signal sets. When the read mode setting unit sets the single-sided read mode, the P-number of first channels are connected to the P-number of first sub-regions to convert to convert P-number of analog signal sets into P-number of digital signal sets. (N-P)-number of second channels of L-number of second channels are connected to the remaining (N-P)-number of first sub-regions to convert (N-P)-number of analog signal sets into (N-P)-number of digital signal sets. The M-number of second sub-regions fail to be connected to any first channel and any second channel.

BRIEF DESCRIPTION OF THE DRAWINGS

The particular features and advantages of the invention as well as other objects will become apparent from the following description taken in connection with the accompanying drawings, in which:

FIG. 4 is an explanatory diagram showing a first reading region read by a first reading unit of the image reading device;

FIG. 5 is an explanatory diagram showing a second reading region read by a second reading unit of the image reading device.

DETAILED DESCRIPTION

1. Mechanical Structure of a Multifunction Peripheral

Figure 1:
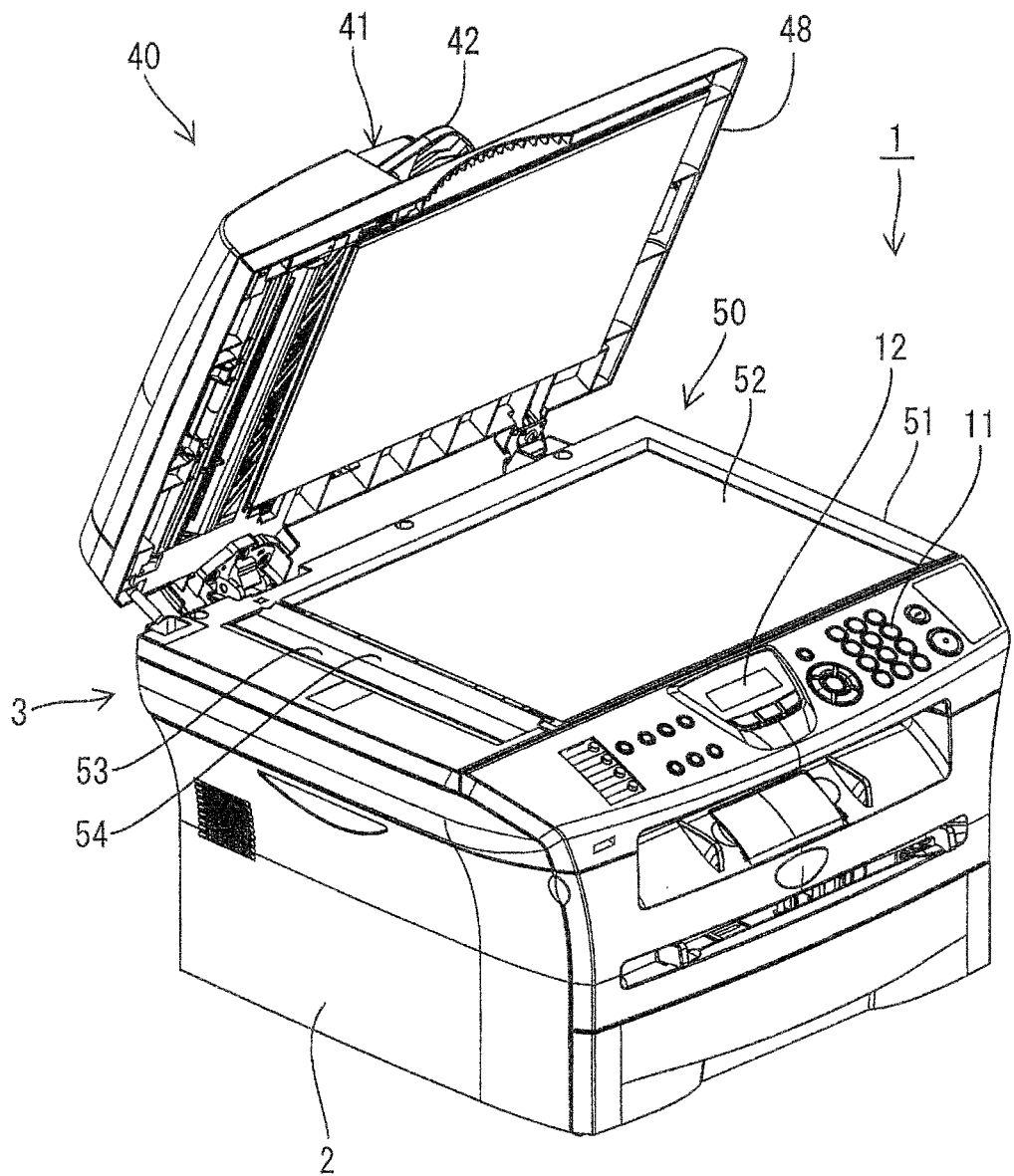
FIG. 1 is a perspective view showing an outer appearance of a multifunction peripheral including an image reading device according to an embodiment of the present invention.

A multifunction peripheral (MFP) 1 has a cover 48 that is rotated upward into its open state in FIG. 1. The MFP 1 is provided with multiple functions, including a printer function, a scanner function, a copier function, and a facsimile function.

As shown in FIG. 1, the MFP 1 includes a main body 2, and an image-reading device 3 disposed on top of the main body 2 for reading original documents. The image-reading device 3 includes a first reading unit 30 described later, an automatic document feeder (ADF) 40, and a flatbed unit 50.

The flatbed unit 50 includes a frame 51, a first platen glass 52, a second platen glass 53, and an intermediate frame disposed between the first platen glass 52 and the second platen glass 53. Each of first and second platen glass 52 and 53 are formed of a transparent glass plate. The cover 48 can open and close over the flatbed unit 50 to reveal and cover the same.

The cover 48 is pivotably coupled to the rear side of the main body 2 (where the side of the main body 2 possessing an operating unit 11 and a display unit 12 will be considered the front side). The cover 48 is capable of pivoting between a closed position for covering the flatbed unit 50 and an open position for exposing the flatbed unit 50. The ADF 40 is provided on top of the cover 48.

Figure 2:
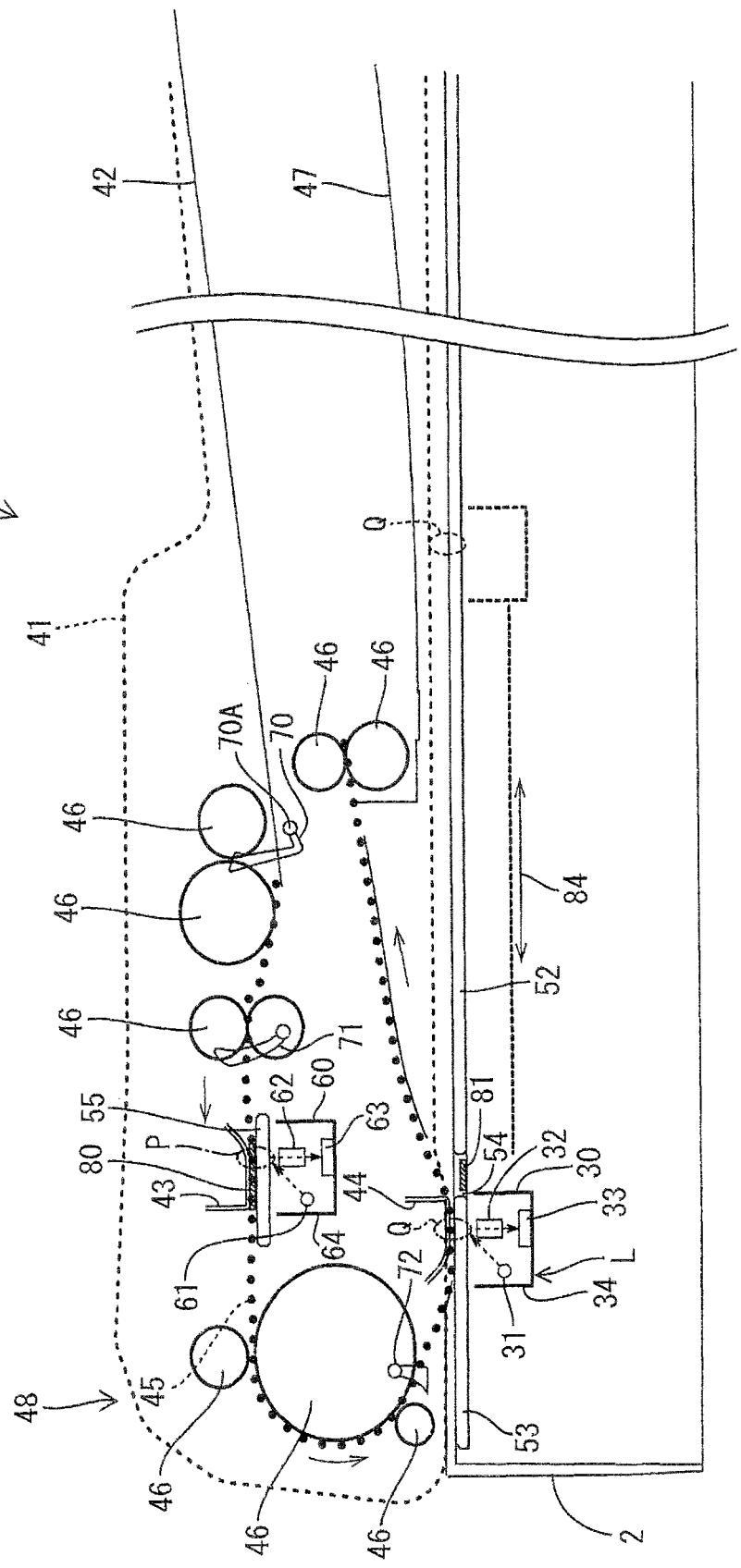
FIG. 2 is a cross-sectional view of the image-reading device when a cover is closed.

As shown in FIG. 2, the ADF 40 includes an ADF cover 41, a tray 42, pressing members 43 and 44, various rollers 46, a discharge tray 47, a third platen glass 55 formed of a transparent glass plate, a second reading unit 60, and document sensors 70-72.

A conveying path 45 is formed in the ADF 40. The conveying path 45 extends from the tray 42 to the discharge tray 47. The rollers 46 and the like convey sheets of an original along the conveying path 45. The reading units 60 and 30 are both disposed adjacent to the conveying path 45.

The first reading unit 30 is disposed inside the main body 2 and is supported so as to be movable in directions along the first platen glass 52 and second platen glass 53 indicated by arrows 84 in FIG. 2. The first reading unit 30 reads an original while moving along the arrows 84, as depicted by the dotted lines in FIG. 2, when the original is static on the first platen glass 52. The first reading unit 30 can also read one surface of an original document conveyed along the conveying path 45. In this case, the first reading unit 30 is moved to a read position L beneath the second platen glass 53, as depicted by the solid lines in FIG. 2. In this case, the first reading unit 30 is disposed downstream of the second reading unit 60 with respect to the conveying path 45 (i.e., closer to the discharge tray 47). The first reading unit 30 reads an original document conveyed along the conveying path 45 as the original passes over the second platen glass 53. The first reading unit 30 is disposed on the outside of the generally circular conveying path 45 and functions to read the surface of the original on the outer side of the conveying path 45. The pressing member 44 confronts the first reading unit 30 with the second platen glass 53 interposed therebetween when the first reading unit 30 has been moved to the read position L and functions to press the original document against the second platen glass 53 so that the original does not float off the second platen glass 53 when passing over the same. Unless otherwise stated, the following description will assume that the first reading unit 30 is positioned and operating beneath the read position L.

A white reference plate 81 is disposed on the bottom of the intermediate frame 54 so that its bottom surface is flush with the bottom surfaces of the first platen glass 52 and second platen glass 53. The first reading unit 30 uses the white reference plate 81 to detect reading results required for shading compensation, light intensity adjustments, and other image correction processes.

The second reading unit 60 is disposed inside the cover 48 on the upstream side of the first reading unit 30 with respect to the conveying path 45 (i.e., closer to the tray 42). The second reading unit 60 is immovably supported relative to the ADF 40. When an original is conveyed along the conveying path 45, the second reading unit 60 reads one surface of the original as the original passes over the third platen glass 55. The second reading unit 60 is disposed inside the generally circular conveying path 45 and functions to read the surface of the document on the inner side of the conveying path 45, which will be called the back surface. The pressing member 43 confronts the second reading unit 60 with the third platen glass 55 interposed therebetween. The pressing member 43 functions to press the original document against the third platen glass 55 so that the original does not float off the third platen glass 55 when passing over the same.

A strip of white tape 80 is affixed to the surface of the pressing member 43 opposing the second reading unit 60. The second reading unit 60 uses this white tape 80 to detect read results required for various image correction processes.

The document sensor 70 is disposed adjacent to the tray 42. A shaft 70A is provided on the underside of the tray 42 for rotatably supporting the document sensor 70. The document sensor 70 is connected to a central processing unit (CPU) 20 that will be described later in greater detail. The document sensor 70 outputs a signal to the CPU 20, enabling the CPU 20 to detect when an original is set in the tray 42. The document sensor 71 is disposed adjacent to the second reading unit 60 on the upstream side of the second reading unit 60 with respect to the conveying path 45. Similarly, the document sensor 72 is disposed adjacent to the first reading unit 30, upstream of the first reading unit 30 but downstream of the second reading unit 60 with respect to the conveying path 45. The document sensors 71 and 72 are also rotatably supported by respective shafts 71A and 72A.

The document sensors 71 and 72 are also connected to the CPU 20 and output a signal to the same. The CPU 20 detects the original document approaching the second reading unit 60 based on the signal outputted from the document sensor 71 and detects the original document approaching the first reading unit 30 based on the signal outputted from the document sensor 72.

When the document sensor 70 detects the presence of an original document in the tray 42, the CPU 20 controls the ADF 40 to drive the rollers 46 in order to convey the original in the tray 42 through the conveying path 45 one sheet at a time. Each sheet of the original conveyed through the conveying path 45 passes over the third platen glass 55 and second platen glass 53 positioned along the conveying path 45 and is discharged into the discharge tray 47.

During this conveying operation, the CPU 20 detects when a sheet of the original has arrived at the second reading unit 60 based on the signal from the document sensor 71 and controls the second reading unit 60 to read the back surface of the sheet as the sheet passes over the third platen glass 55. Similarly, the CPU 20 detects when the sheet has arrived at the first reading unit 30 based on the signal outputted from the document sensor 72 and controls the first reading unit 30 to read the front surface of the original as the sheet passes over the second platen glass 53.

Next, the structures of the first and second reading units 30 and 60 will be described. Since the first and second reading units 30 and 60 each have the same structure, the first reading unit 30 will be used as an example in the following description, with the reference numbers for components in the second reading unit 60 included in parentheses.

The reading unit 30 (60) employs a compact image sensor (CIS) for reading an original that passes over the second platen glass 53 (third platen glass 55). The first reading unit 30 includes a linear image sensor 33 (63) having a plurality of light-receiving elements arranged linearly in a one-dimensional array in a direction orthogonal to the surface of the drawing in FIG. 2; a light source 31 (61) having light-emitting diodes for the three RGB colors; a rod lens array 32 (62) focusing reflected light from the light source 31 (61) reflected off the original document onto each of the light-receiving elements of the linear image sensor 33 (63); a carriage 34 (64) on which the linear image sensor 33 (63), light source 31(61), and rod lens array 32 (62) are mounted; and a conveying mechanism (not shown) for conveying the carriage 34 (64).

Note that the first reading unit 30 is not limited to a CIS type, but may have a charged coupled device (CCD) as its image sensor. Further, the first and second reading units 30 and 60 do not necessarily need to have the same structure. For example, one of the first and second reading units 30 and 60 may be a CIS type and the other a CCD type.

As shown in FIG. 4, the first reading unit 30 reads original documents within a reading area P. The reading area P extends 297 mm in the main scanning direction indicated by arrows 85 in FIG. 4. In other words, the reading area P of the first reading unit 30 is set such that the maximum reading width of the first reading unit 30 is equivalent to the width (short-side dimension) of art A3-size sheet. The reading area P is further divided into five sub-regions P1-P5. The linear image sensor 33 of the first reading unit 30 is divided into five subdivisions corresponding to the sub-regions P1-P5 and has a plurality of light-receiving elements arranged in each subdivision. When scanning an original or the like, the first reading unit 30 reads image data D for each light-receiving element and outputs this analog image data D for each subdivision of the linear image sensor 33 to first and second analog front ends (AFEs) 35 and 65 described later. Below, the subdivisions of the linear image sensor 33 may be referred to as the sub-regions P1-P5.

The sub-regions P1-P5 are juxtaposed in this order along the main scanning direction of the first reading unit 30. The three center sub-regions P2-P4 constitute a first region R1 having a width in the main scanning direction equivalent to the short side of an A4-size sheet. Hence, when the MFP 1 reads an A4-size original, the original is positioned in the first region R1 to be read by the first reading unit 30. The sub-regions P2-P4 each have a length of 70 mm in the main scanning direction. Hence, the first region R1 is divided equally by the sub-regions P2-P4.

Further, the sub-regions P1 and P5 constitute a second region R2 in the main scanning direction that is configured of the reading area P minus the first region R1. The first region R1 is arranged such that its center in the main scanning direction is allocated to the center of the reading area P in the main scanning direction. Accordingly, the second region R2 is equally divided by the sub-regions P1 and P5, each having a length of 43.5 mm in the main scanning direction.

As shown in FIG. 5, the second reading unit 60 scans an original document in a reading area Q. The reading area Q extends 210 mm in the main scanning direction, as indicated by arrows 86 in FIG. 5. Hence, the reading area Q is shorter than the reading area P and equivalent to the first region R1. That is, the reading urea Q is configured such that the maximum reading width of the second reading unit 60 is equivalent to the width (short-side dimension) of an A4-size sheet. The reading area Q of the second reading unit 60 is divided into three sub-regions Q1-Q3. More specifically, the linear image sensor 63 of the second reading unit 60 is divided into three subdivisions corresponding to the sub-regions Q1-Q3, with a plurality of light-receiving elements arranged in each subdivision. When scanning an original document or the like, the second reading unit 60 reads image data D from each light-receiving element and outputs this analog image data D for each subdivision of the linear image sensor 63 to the second AFE 65. Below, the subdivisions of the linear image sensor 63 may be referred to as the sub-regions Q1-Q3.

The sub-regions Q1-Q3 are juxtaposed in this order along the main scanning direction of the second reading unit 60. Each of the sub-regions Q1-Q3 has a width of 70 mm in the main scanning direction. In other words, the reading area Q is equally divided by the sub-regions Q1-Q3.

To read both surfaces of an A4-size original using the ADF 40, the first reading unit 30 reads the original in the first region R1, while the second reading unit 60 reads the original in the reading area Q. Therefore, the center of the first region R1 within the conveying path 45 of the ADF 40 is aligned with the center of the reading area Q in the main scanning direction. Consequently, the reading area P of the first reading unit 30 and the reading area Q of the second reading unit 60 are arranged in the conveying path 45 of the ADF 40 such that their centers in the main scanning direction are aligned.

On its front side, the MFP 1 is further provided with an operating unit 11 that includes various buttons through which a user can input operations and commands, and a display unit 12 configured of an LCD for displaying the status of the MFP 1.

2. Electrical Structure of the Multifunction Peripheral

Figure 3:
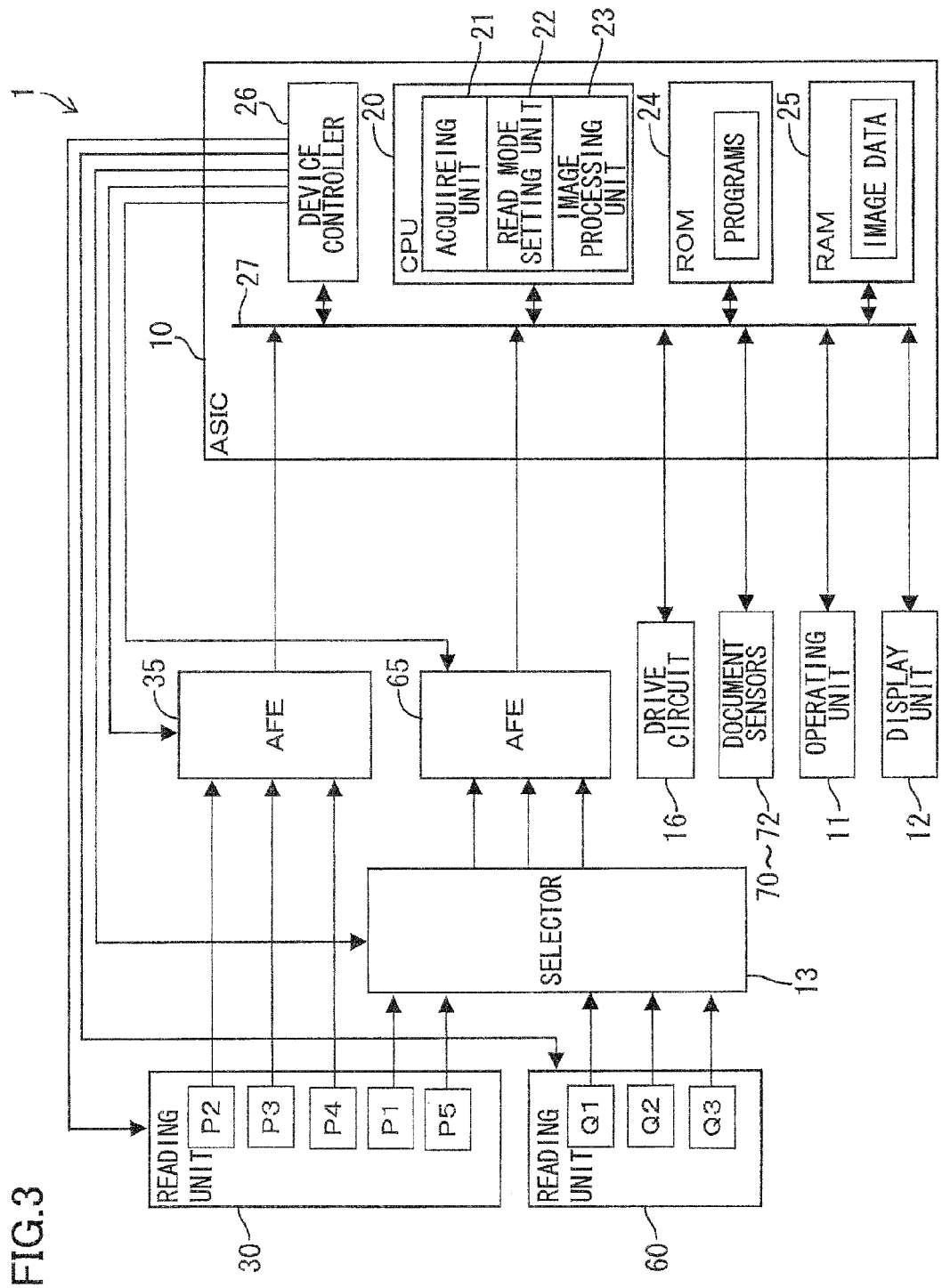
FIG. 3 is a block diagram showing an electrical structure of the multifunction peripheral.

As shown in FIG. 3, the MFP 1 includes an application-specific integrated circuit (ASIC) 10 for controlling the components of the MFP 1. The ASIC 10 includes the CPU 20, a ROM 24, a RAM 25, and a device controller 26 via a bus 27. The components in the ASIC 10 are connected to the operating unit 11, display unit 12, selector 13, reading units 30 and 60, first and second AFEs 35 and 65, and a drive circuit 16 for driving the rollers 46 (see FIG. 2), and the document sensor 70-72 via the bus 27.

The ROM 24 stores various programs that control operations of the MFP 1. The CPU 20 reads programs from the ROM 24 and executes these programs to control components of the MFP 1. The CPU 20 can function as an acquiring unit 21, a reading setting unit 22, and an image processing unit 24, and the like.

The device controller 26 is connected to the first and second reading units 30 and 60 and transmits control signals to the first and second reading units 30 and 60 based on commands received from the CPU 20. Upon receiving these control signals, the first and second reading units 30 and 60 set which of the first and second reading units 30 and 60 and the sub-regions P1-P5 and sub-regions Q1-Q3 are to be used for reading. For example, when reading the front surface of an A3-size original, the first reading unit 30 reads the original using the sub-regions P1-P5, while the second reading unit 60 is idle. To read both surfaces of an A4-size original, the sub-regions P2-P4 for the first reading unit 30 and the sub-regions Q1-Q3 for the second reading unit 60 are used for reading the original document, while the sub-regions P1 and P5 of the first reading unit 30 are not used.

Also, based on the control signals, the first and second reading units 30 and 60 set a read timing and an output timing for reading and outputting the image data D with the selected sub-regions P1-P5 and sub-regions Q1-Q3. The sub-regions P2-P4 of the first reading unit 30 output the image data D to the first AFE 35, while the sub-regions P1-P5 of the first reading unit 30 and the sub-regions Q1-Q3 of the second reading unit 60 output the image data D to the second AFE 65 via the selector 13.

The device controller 26 is connected to the selector 13 and transmits a control signal to the selector 13 based on commands received from the CPU 20. Upon receiving this control signal, the selector 13 determines which of the first and second reading units 30 and 60 to connect to the second AFE 65 based on the control signal. For example, when the MFP 1 is reading the front surface of an A3-size original document, the selector 13 connects the first reading unit 30 to the second AFE 65 to transmit the image data D read by the sub-regions P1 and P5 of the first reading unit 30 to the second AFE 65. When the MFP 1 is reading both surfaces of an A4-size original, the selector 13 connects the second reading unit 60 to the second AFE 65 to transmit image data D read by the sub-regions Q1-Q3 of the second reading unit 60 to the second AFE 65.

The device controller 26 is also connected to the first and second AFEs 35 and 65 and transmits control signals thereto based on commands received from the CPU 20. Each of the first and second AFEs 35 and 65 has three channels and can simultaneously process image data D for three analog signals outputted from the sub-regions P1-P5 and sub-regions Q1-Q3. Upon receiving the control signals, the AFEs 35 and 65 convert the image data D in the form of an analog signal to image data D in the form of a digital signal and stores the converted image data D in the RAM 25 via the bus 27.

3. Reading Process

Next, a reading process performed by the CPU 20 of the MFP 1 for reading an original document will be described with reference to FIG. 6. In the reading process according to the preferred embodiment, the CPU 20 can execute a process for reading both surfaces of an A4-size original and a process for reading a single surface of an A3-size original when the original is conveyed by the ADF 40, as well as a process for reading an A3-size original when the original is placed on the platen 52 of the flatbed unit 50.

Figure 6:
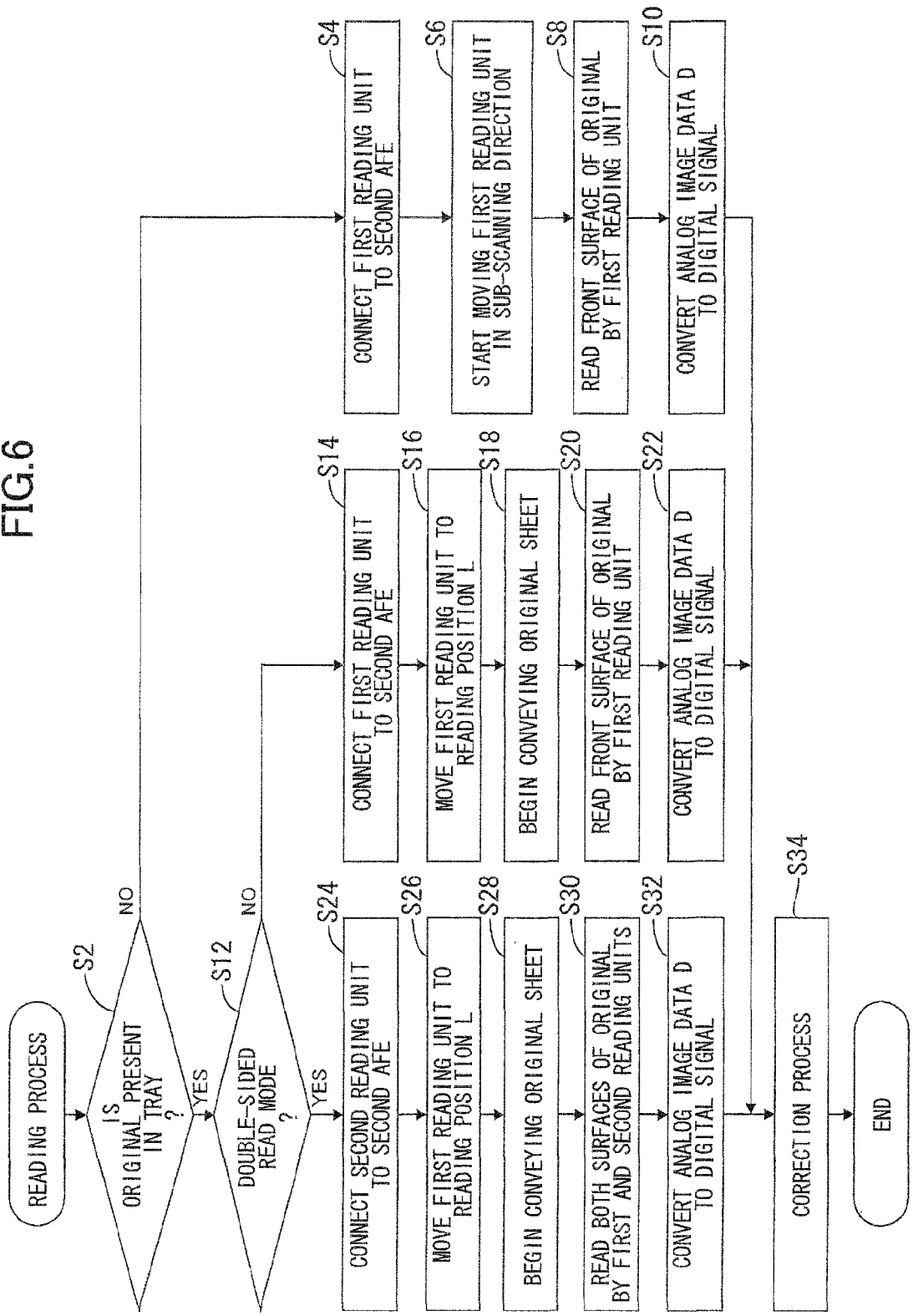
FIG. 6 is a flowchart illustrating steps in a reading process executed by the image reading device.

The CPU 20 executes this reading process shown in FIG. 6 according to a prescribed program. When the user sets an original document in the tray 42 of the MFP 1 or places an original document in the flatbed unit 50 and inputs a command for reading an original through the operating unit 11 or a display unit 12 capable of accepting input, the CPU 20 begins executing the reading process. In S2 at the beginning of the reading process, the CPU 20 functioning as the read setting unit 22 determines whether an original is present in the tray 42 based on the signal received from the document sensor 70.

If an original is not set in the tray 42 (S2: NO), the CPU 20 advances to S4 to perform a flatbed reading process for reading an original placed on the flatbed unit 50 and reads only the front surface of the original using the first reading unit 30.

After branching to the flatbed reading process (S2: NO), in S4 the CPU 20 controls the selector 13 to connect the first reading unit 30 to the second AFE 65. Through this process, the image data D read by the sub-regions P1 and P5 of the first reading unit 30 is transmitted to the second AFE 65 through the selector 13.

In S6 the CPU 20 functioning as the acquiring unit 21 starts moving the first reading unit 30 in a direction along the arrows 84 shown in FIG. 2, and in S8 reads the top surface of the original that is static on the first platen glass 52. In S10 the analog image data D read by the sub-regions P2-P4 of the first reading unit 30 corresponding to the first region R1 is outputted to the first AFE 35 and converted by the first AFE 35 to a digital signal, and the analog image data D read by the sub-regions P1-P5 corresponding to the second region R2 is outputted to the second AFE 65 and converted by the second AFE 65 to a digital signal.

Alternatively, if the CPU 20 determines in S2 that an original is present in the tray 42 (S2: YES), in S12 the CPU 20 determines whether a read command inputted by the user indicates the double-sided read mode. If the user-inputted read command indicates the single-sided read mode (S12: NO), then the CPU 20 advances to S14 to perform a single-sided reading process with the ADF 40 (ADF single-sided reading process) for reading the front surface of the original using the first reading unit 30.

When the CPU 20 branches to the ADF single-sided reading process (S12: NO), in S14 the CPU 20 controls the selector 13 to connect the first reading unit 30 to two channels of the second AFE 65. At this time, the second reading unit 60 fails to be connected to the second AFE 65. Through this process, the image data D read by the sub-regions P1 and P5 of the first reading unit 30 is transmitted to the second AFE 65 through the selector 13.

In S16 the CPU 20 moves the first reading unit 30 to the read position L and in S18 begins conveying the original sheets. As described above, the first region R1 configured of the sub-regions P2-P4 is arranged so that its center in the main scanning direction is aligned with the center of the reading area P in the main scanning direction. Hence, the original is positioned in the tray 42 based on the widthwise center point of the tray 42, and the CPU 20 drives the rollers 46 using the drive circuit 16 to convey the original through the conveying path 45.

After initiating conveyance of the original, in S20 the CPU 20 functioning as the acquiring unit 21 reads the surface of the original using the first reading unit 30 while monitoring the position of the original in the conveying path 45 based on the document sensors 70-72. In S22 the analog image data D read by the sub-regions P2-P4 of the first reading unit 30 that correspond to the first region R1 is outputted to the first AFE 35 and converted by the first AFE 35 into a digital signal, while the analog image data D read by the sub-regions P1 and P5 of the first reading unit 30 that correspond to the second region R2 is outputted to the second AFE 65 and converted by the second AFE 65 into a digital signal.

On the other hand, if the CPU 20 determines in S12 that the user-inputted read command indicates the double-sided read mode (S12: YES), the CPU 20 advances to S24 to execute a double-sided reading process with the ADF 40 (ADF double-sided reading process) in order to read both surfaces of the original using the first and second reading units 30 and 60.

After branching to the ADF double-sided reading process (S12: YES), in S24 the CPU 20 controls the selector 13 to connect the second reading unit 60 to the second AFE 65. Through this process, the image data D read by the sub-regions Q1-Q3 of the second reading unit 60 is transmitted to the second AFE 65 through the selector 13. At this time, the two sub-regions P1 and P5 of the first reading unit 30 fail to be connected to the first and second AFEs 35 and 65.

In S26 the CPU 20 moves the first reading unit 30 to the read position L and in S28 begins conveying the original sheets. After initiating conveyance of the original, in S30 the CPU 20 functioning as the acquiring unit 21 reads both surfaces of the original using the first and second reading units 30 and 60 while monitoring the position of the original within the conveying path 45 based on signals outputted from the document sensors 70-72. In S32 the analog image data D read by the first reading unit 30 is outputted to the first AFE 35 and converted by the first AFE 35 to a digital signal, while the analog image data D read by the second reading unit 60 is outputted to the second AFE 65 and converted by the second AFE 65 to a digital signal.

After the first and second AFEs 35 and 65 have converted the image data D to a digital signal in S10, S22, or S32, in S34 the CPU 20 functioning as the image processing unit 23 executes required image correction processes, such as shading compensation, on the converted image data D. The CPU 20 stores the corrected image data D in the RAM 25 and ends the reading process.

4. Effects of the Embodiment (1) When an original document is set in the tray 42 and a read command specifying the single-sided read mode is issued, the MFP 1 according to the above-described embodiment can use the first reading unit 30 to read an A3-size original. In such a case, the CPU 20 connects the first reading unit 30 to the second AFE 65 and performs an A/D conversion process on the image data D outputted from the sub-regions P1 and P5 of the first reading unit 30. When the read command specifies the double-sided read mode, the MFP 1 can read an A4-size original using the first and second reading units 30 and 60. In this case, the CPU 20 connects the second reading unit 60 to the second AFE 65 and executes an A/D conversion process on the image data D outputted from the sub-regions Q1-Q3 of the second reading unit 60. With this configuration, a common AFE can be used to process the image data D outputted from the first reading unit 30 that is not processed by the first AFE 35 when the MFP 1 is set to the single-sided read mode and to process the image data D outputted from the second reading unit 60 when the MFP 1 is set to the double-sided read mode, thereby reducing the number of AFEs required in the MFP 1. As a result, it is possible to reduce the manufacturing cost of the MFP 1 and to reduce the size of the MFP 1 by eliminating the space required for housing an additional AFE.

(2) In the MFP 1 according to the above-described embodiment, the first region R1 of the first reading unit 30 is equally divided by the sub-regions P2-P4. The second region R2 of the first reading unit 30 is equally divided by the sub-regions P1 and P5, and the reading area Q of the second reading unit 60 is equally divided by the sub-regions Q1-Q3. In this way, the first and second reading units 30 and 60 can output an equal quantity of image data D for each subdivision, thereby supplying equal quantities of image data D to be processed in each channel of the first and second AFEs 35 and 65. Hence, the time required for the first and second AFEs 35 and 65 to complete processing is shorter than the time required when the quantity of image data D outputted for each subdivision differs.

(3) In the MFP 1 according to the above-described embodiment, the reading area P of the first reading unit 30 and the reading area Q of the second reading unit 60 are arranged in the conveying path 45 of the ADF 40 so that their center points are aligned in the main scanning direction. Accordingly, the first and second reading units 30 and 60 can precisely read an original by positioning the original to be conveyed along the conveying path 45 of the ADF 40 based on a center reference point.

In the MFP 1 according to the above-described embodiment, the document sensors 70-72 and the rollers 46 can be arranged along a centerline of the conveying path 45 connecting the center of the reading area P and the center of the reading area Q. Hence, it is not necessary to dispose a plurality of document sensors 70-72 and rollers 46 along the conveying path 45 to support a plurality of sizes of original documents supported by the ADF 40, unlike when the original documents are positioned based on one side edge, thereby reducing manufacturing costs.

(4) The selector 13 provided in the MFP 1 according to the above-described embodiment can smoothly switch the unit connected to the second AFE 65 between the first and second reading units 30 and 60 based on control signals received from the CPU 20 when the CPU 20 is functioning as the read setting unit 22.

(5) The MFP 1 according to the above-described embodiment can be set to perform single-sided reading of an original according to the flatbed reading process, double-sided reading of an original according to the ADF reading process, and single-sided reading of an original according to the ADF reading process. Accordingly, the MFP 1 can be configured to read various types of originals.

(6) The MFP 1 according to the above-described embodiment can shift between the flatbed reading process and the ADF reading process based on whether an original is set in the tray 42. Hence, even if the user accidentally specifies the wrong reading process with the ADF 40 after placing an original on the first platen glass 52, the MFP 1 can read the original on the first platen glass 52 using the first reading unit 30 when detecting that an original is not present in the tray 42.

While the invention has been described in detail with reference to the embodiment thereof, it would be apparent to those skilled in the art that various changes and modifications may be made therein without departing from the spirit of the invention, the scope of which is defined by the attached claims.

(1) In the above-described embodiment, the present invention is applied to a MFP 1, but the present invention may be applied to any device possessing at least one of a printer function, scanner function, copier function, and facsimile function, for example.

(2) In the above-described embodiment, the MFP 1 has a single ASIC 10, and the ASIC 10 possesses a single CPU 20 used to implement the functions of the acquiring unit 21, read setting unit 22, image-processing unit 23, and the like. However, the units mentioned above may be configured with distinct and separate CPUs, ASICs, and the like.

(3) In the above-described embodiment, the selector 13 is used to select which of the first and second reading units 30 and 60 is connected to the second AFE 65, but means other than the selector 13 may be used to accomplish this purpose. For example, an enable terminal may be provided on the output terminal of each of the first and second reading units 30 and 60 for enabling or disabling output. The enable terminals are connected to the device controller 26, for example. In response to a command from the CPU 20, the device controller 26 outputs enable signals to the first and second reading units 30 and 60 to enable or disable output of image data D from the corresponding output terminals.

(4) In the above-described embodiment, the reading area P is set such that the maximum reading width of the first reading unit 30 is equivalent to the width (short-side dimension) of an A3-size sheet, and the reading area Q is set such that the maximum reading width of the second reading unit 60 is equivalent to the width of an A4-size sheet, but the reading areas P and Q are not limited to these sizes. For example, the reading area P of the first reading unit 30 may be set to have a maximum reading width equivalent to the width of an A3-size sheet, while the reading area Q of the second reading unit 60 is set to have a maximum reading width equivalent to the width of a letter-size sheet.

(5) In the above-described embodiment, the reading area P of the first reading unit 30 is divided into five sub-regions P1-P5, the reading area Q of the second reading unit 60 is divided into three sub-regions Q1-Q3, and each of the first and second AFEs 35 and 65 possess three channels. However, the sub-regions of the reading units and the channels of the AFEs are not particularly limited to these specifications, provided that the following relationships are satisfied, where N is a natural number indicating the sub-regions of the reading area P, M is a natural number indicating the sub-regions of the reading area Q, and L is a natural number indicating the number of AFE channels.

$$M \leq L \leq N, N \leq 2L$$

(6) In the above-described embodiment, the AFEs are described as devices having a finite number of channels that are used to perform conversions and other processes, but the details of these processes and the devices used to perform them are not limited to those specified in the preferred embodiment. For example, an image-processing circuit, encryption circuit, D/D convertor circuit, and the like may be used to perform such processes as image correction, encryption, and digital-digital conversion.

What is claimed is:

1. An image reading device comprising:
    a first reading unit configured to read one surface of an original sheet, the first reading unit including a first reading region having a first width, the first reading region being divided into N-number of first sub-regions each of which reads a respective portion of the one surface, the N-number of first sub-regions acquiring N-number of sets of analog signal respectively, the original sheet having the one surface and another surface;
    a second reading unit configured to read the another surface, the second reading unit including a second reading region having a second width shorter than the first width, the second reading region being divided into M-number of second sub-regions each of which reads a respective portion of the another surface, the M-number of second sub-regions acquiring M-number of sets of analog signal respectively, M being an integer smaller than N;
    a control device configured to set one of a single-sided read mode and a double-sided read mode, wherein, in the single-sided read mode, the first reading unit reads the one surface and the second reading unit fails to read the another surface, and, in the double-sided read mode, the first reading unit reads the one surface and the second reading unit reads the another surface;
    a first converting unit including L-number of first channels each of which is configured to convert a set of analog signal into a set of digital signal, L being an integer greater than or equal to M and smaller than or equal to N, N being smaller than or equal to 2×L, the L-number of first channels being connected to L-number of first sub-regions, the N-number of first sub-regions of the first reading unit including the L-number of first sub-regions;
    a second converting unit including L-number of second channels each of which is configured to convert a set of analog signal into a set of digital signal; and
    a selector device configured to selectively connect the second converting unit to one of: the M-number of second sub-regions of the second reading unit; and (N-L) number of first sub-regions other than the L-number of first sub-regions, the N-number of first sub-regions of the first reading unit including the (N-L)-number of first sub-regions other than the N-number of first sub-regions; and wherein when the control device sets the double-sided read mode, the control device controls the selector device to connect the M number of second sub-regions of the second reading unit to M-number of second channels, the L-number of second channels of the second converting unit including the M-number of second channels,
    the (N-L)-number of first sub-regions fail to be connected to any converting units;
    the first converting unit converts L-number of analog signal sets acquired by the first reading unit into L-number of digital signal sets as first image data corresponding to the one surface of the original sheet,
    the second converting unit converts L-number of analog signal sets acquired by the second reading unit into L-number of digital signal sets as second image data corresponding to the another surface of the original sheet,
    wherein when the control device sets the single-sided read mode, the control device controls the selector device to connect the (N-L)-number of first sub-regions of the first reading unit to (N-L)-number of second channels, the L-number of second channels including the (N-L)-number of second channels,
    the first converting unit converts L-number of analog signal sets acquired by the first reading unit into L-number of digital signal sets,
    the second converting unit converts (N-L)-number of analog signal sets acquired by the first reading unit into (N-L)-number of digital signal sets,
    the L-number of digital signal sets acquired by the first converting unit and the (N-L)-number of digital signal sets acquired by the second converting unit constitute the first image data.

2. The image reading device according to claim 1, wherein each of the L-number of first sub-regions has a first prescribed width, each of the (N-L)-number of first sub-regions having a second prescribed width.

3. The image reading device according to claim 1, wherein a center of the third reading region is allocated to a center of the first reading region.

4. The image reading device according to claim 1, further comprising:
    a main body having a platen on which the original sheet is placed; and
    a cover configured to open and cover the platen and has a conveying path in which the original sheet is conveyed,
    wherein the first reading unit is provided on the main body, the first reading unit reading one surface of original sheet placed on the platen when the control device sets the single-sided read mode, the first reading unit reading one surface of original sheet conveyed in the conveying path when the control device sets the double-sided read mode;
    wherein the second reading unit is provided on the cover and reads another surface of the original sheet conveyed in the conveying path when the control device sets the double-sided read mode.

5. The image reading device according to claim 1, wherein the first width is equivalent to a short-side dimension of an A3-size sheet, the second width being equivalent to a short-side dimension of an A4-size sheet.

6. The image reading device according to claim 1, wherein N is 5, M being 3, L being 3, P being 3.

* * * * *